United States Patent
Rossel

[15] 3,665,992
[45] May 30, 1972

[54] TIRE WITH RETRACTABLE STUDS

[72] Inventor: Joseph Rossel, 253 10th Avenue, New York, N.Y. 10001

[22] Filed: Nov. 9, 1970

[21] Appl. No.: 87,962

[52] U.S. Cl. ................................................152/208
[51] Int. Cl. ......................................................B60c 11/00
[58] Field of Search..................................................152/208

[56] References Cited

UNITED STATES PATENTS

| 3,095,918 | 7/1963 | Mike | 252/208 |
| 3,516,466 | 6/1970 | Smit | 152/208 |

*Primary Examiner*—James B. Marbert

[57] ABSTRACT

A tire with retractable hollow studs and pressure sensing means for extending the studs when the pressure in the tire exceeds a selected pressure and for retracting the studs at a second and lower pressure.

1 Claim, 6 Drawing Figures

Patented May 30, 1972 3,665,992
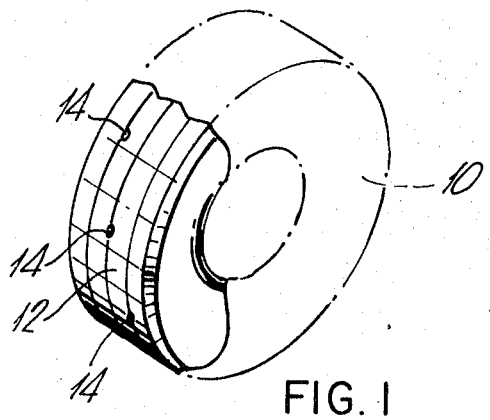
FIG. 1
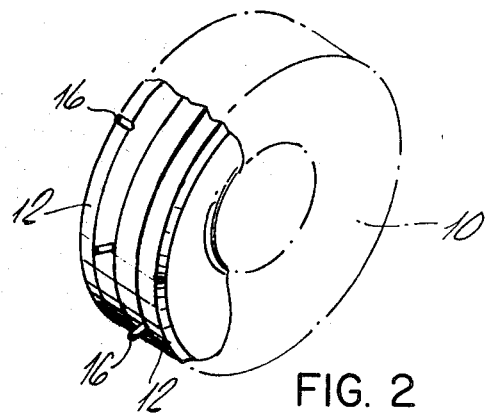
FIG. 2
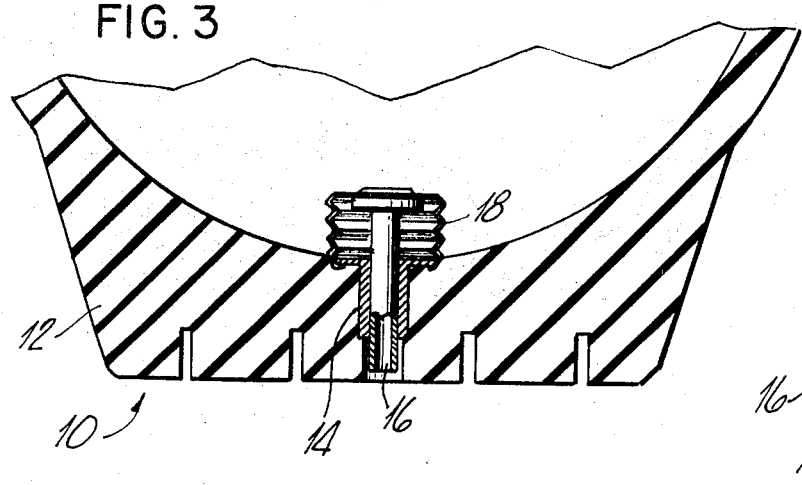
FIG. 3
FIG. 4
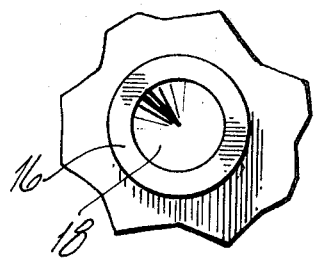
FIG. 5
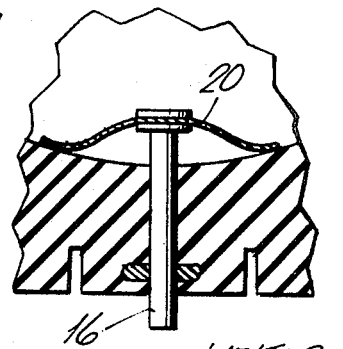
FIG. 6
INVENTOR
JOSEPH ROSSEL

TIRE WITH RETRACTABLE STUDS

SUMMARY OF THE INVENTION

In my invention, an inflatable tire has a plurality of spaced bores extending transversely through the peripheral wall. A separate stud extends in each bore. Pressure sensitive means such as diaphrams are disposed in the interior tire chamber, each diaphrams extending around a corresponding stud and secured to the inner end thereof. Each diaphram is also secured to the inner surface of the peripheral wall. When the air pressure in the tire is relatively low, the diaphrams are all expanded pulling all studs to fully retracted positions within the corresponding bores. When the air pressure is relatively high, the diaphrams are all compressed pushing all studs outwardly through the bores to fully extended position.

Thus, a driver of a vehicle can adjust the tire studs at will depending upon weather and road conditions and no longer has to use special tires for winter use and other tires for summer use.

The use of hollow studs permits use of studs both larger and lighter than solid studs. Moreover hollow studs operate with less noise, remain sharp and grip roads without damage.

BRIEF DESCRIPTION OF THE DRAWINGS

In the drawings:

FIG. 1 is a perspective view of my tire with studs retracted;
FIG. 2 is a similar view with studs extended;
FIG. 3 is a cross section of the tire of FIG. 1;
FIG. 4 is a cross section of the tire of FIG. 2;
FIG. 5 is a view taken along line 5—5 in FIG. 4; and
FIG. 6 is a detail view of a modification of the structure shown in FIGS. 3 and 4.

DETAILED DESCRIPTION OF PREFERRED EMBODIMENTS

Referring now to FIGS. 1-5, an inflatable tire 10 having an interior chamber and a peripheral wall 12 is also provided with a plurality of bores 14 extending from the chamber to the wall. A hollow stud 16 extends in each bore. The front end of each stud is open. A flexible pressure sensitive diaphram 18 is disposed around each stud with one end of the diaphram sealed to the inner surface of wall 12 and the other end sealed to the inner sealed end of the stud. At relatively low tire pressures (always above atmospheric), the diaphrams are all expended and the studs are retracted in the bores. At relatively high pressures, the diaphrams are compressed and the studs are pushed outward through the bores to fully extended positions.

The invention can then be used as previously indicated.

FIG. 6 shows a modification wherein diaphrams 18 are replaced by pressure sensitive membranes 20. The action is the same as in FIGS. 1-5.

While I have described my invention with particular reference to the drawings, such is not to be considered as limiting its actual scope.

Having thus described this invention, what is asserted as new is:

1. In a tire having retractable and extendable studs, the retractable position of said studs being at normal tire pressure; the extended position of the studs being at an elevated tire pressure, said studs are hollow and closed at one end and open at the other end, the closed end being at the interior of the tire and the open end adapted to grip in ice or snow when extended, the closed end is embedded in a bellows-type, pressure sensitive and compressible material which grips the hollow stud firmly and moves the stud back and forth in a manner to avoid any contact of the outside surface of the stud with any other surface part of the construction the bellows type, bottle cork shaped material to be the only holder and guide for the hollow stud and the stud to make contact with the tire body only when required to help traction.

* * * * *